Patented Sept. 26, 1944

2,359,071

UNITED STATES PATENT OFFICE 2,359,071

METHOD OF TREATING GLASS SURFACES

Frederick W. Adams, Pittsburgh, Pa., assignor to Pittsburgh Plate Glass Company, Allegheny County, Pa., a corporation of Pennsylvania No Drawing. Application February 27, 1943, Serial No. 477,447

1 Claim. (Cl. 41—42)

The present invention relates to the formation of matte surfaces upon glass, and it has particular relation to the formation of such surfaces by etching the glass with a corrosive substance, such as hydrofluoric acid.

One object of the invention is to provide a process of etching surfaces of glass to provide a matte finish, which is simple and inexpensive to practice, and which produces a uniform and pleasing texture of the surface.

It has heretofore been proposed to form matte or dull finishes upon glass surfaces by exposing them to the action of an etching agent, such as hydrofluoric acid. In this operation the entire surface is more or less etched.

In accordance with the provisions of the present invention it is proposed to provide glass and notably structural glasses, such as the coloured glass sold under the trade name of "Carrara" glass, with a matte or dull finish in a stippled pattern by applying to the surface a suspension in a non-solvent medium of very finely-divided plastic particles designed to adhere to the surface in such manner as to provide minute points of protection and then to subject the surface to an etching agent, such as hydrofluoric acid, in order to erode those portions of the surface not completely protected by the plastic.

In the practice of the invention various plastics which can be formed into fine powders and which have reasonable resistance to the etching agent may be employed. Vinyl resins such as partial polyvinyl acetal resins, e. g., polyvinyl butyral, which may be of the grade employed as the reinforcing layer in safety glass is quite suitable for the purpose. Still other resins that may be employed include vinyl chloride, vinyl acetate and the copolymer of polyvinyl acetate and polyvinyl chloride known under the trade name of "Vinylite H" which is understood to include about 13% of polyvinyl acetate and about 87% of polyvinyl chloride. Acrylate resins, such as methyl methacrylate and butyl methacrylate, are also contemplated. Cellulosic esters, such as cellulose acetate, or cellulose ether, such as ethyl cellulose, may likewise be employed. Similarly heat hardenable plastics, such as alkyd resins and "Bakelite" resins in an intermediate stage of polymerization may be employed.

In the formation of a powder of the resin suitable for the practice of the invention any method which will yield finely-divided powders may be employed. However, one of the most practical methods of forming such powder involves the solution of the plastic in a suitable solvent to which a precipitant agent is added to the point of incipient gelation. The solution is then subjected simultaneously to agitation and cooling until the plastic solution gels and breaks into a fine suspension of plastic particles in the liquid medium. This suspension may be drowned in additional precipitating agent and then filtered. The following constitutes specific examples of the preparation of powders suitable for use in the practice of the invention:

Example A

About 150 parts of the resin obtained by partial condensation of polyvinyl alcohol with butyraldehyde was dissolved in 850 parts of synthetic methanol. To this solution under agitation at room temperature was added 90 parts of water. The resin was partially precipitated during this addition but redissolved upon continued agitation to a clear fluid solution. The charge was continuously agitated and was gradually cooled. At 18° C. the charge became translucent and started gelling and at 5° C. the gel was quite heavy and viscous. Very strong agitation was required to keep the solution homogeneous at this point. At —3° C. some syneresis occurred and at —10° C. the gel began breaking and precipitation started. At —20° C. the resin had precipitated and the product was in fluid suspension. It was further cooled to —30° C. and an additional 2000 parts of water was added at this point to harden the resin. The mixture was poured into 3000 parts of water at room temperature and the product was isolated by filtration. It was dried in a current of air at 25° C. to yield a very light fluffy powder, 94.7% of which readily passed a 200 mesh sieve. Under the microscope the particle size appeared to be very uniform and in the neighborhood of 1000 mesh.

The filtered resin may be dried at any temperature below its softening point without serious coalescence of the resultant powder. A temperature of 45–50° C. has been found generally most satisfactory for polyvinyl acetal resins.

Example B

A solution was prepared by dissolving under agitation at room temperature, 100 parts of the resin obtained by copolymerizing, 87 parts of vinyl chloride and 13 parts of vinyl acetate in 900 parts of acetone. To this solution under agitation were added 320 parts of 68% isopropanol. Particles of resin precipitated during this addition but redissolved readily upon continued agitation. There resulted a slightly hazy but very fluid solution which was gradually cooled. At 5° C. the solution had become very hazy and quite viscous. At —4° C. the resin precipitated in very finely divided form to yield a fluid suspension. Cooling to —40° C. brought no further change in the appearance of the suspension.

An additional 700 parts of 88% isopropanol were added at —40° C. and immediately thereafter 1500 parts of water raising the temperature to —24° C. The charge was then dropped into 7000 parts of water at room temperature. After filtering and drying, less than 2% of the powder failed to pass a 200 mesh sieve.

Example C

Fifty parts of a commercial polymerized methacrylic resin known as "Acryloid BC-27" were dissolved in 450 parts of acetone. To this solution under agitation at room temperature were added 75 parts of water. The resulting clear solution was gradually cooled. At 9° C. it was viscous and haziness appeared. At 2° C. it was very hazy and viscous and required strong agitation to keep the mixture homogeneous. Between 0 and —5° C. the viscosity decreased very rapidly indicating that the gel had broken and the resin precipitated. At —8° C. an additional 500 parts of water were added after which the charge was dropped into 6000 parts of water at room temperature.

After mixing 1 hour the resin was filtered and was subsequently dried. It was then obtained as a fine powder the major portion of which readily passed a 200 mesh sieve.

Example D

A sample of polyvinyl alcohol was prepared by the hydrolysis of low viscosity polyvinyl acetate by the method described by Blaikie and Crozier, J. Ind. and Eng. Chem. 28, 1158 (1936). According to this method 50 parts of the polyvinyl acetate known commercially as "Vinylite AYAA" were dissolved in 100 parts of synthetic methanol. A solution of 0.25 part of caustic potash in 10 parts of methanol was added. After several hours, the solution had set to a gel and after 18 hours, a rubbery gel remained covered by a clear mixture of methyl acetate and methanol. The solvent was decanted and the gel was dissolved in water. The resulting solution was held at 90-100° C. until the residual methanol and methyl acetate had been distilled. Additional water was then added so that the final concentration corresponded to the addition of 330 parts of water.

To this solution under agitation was added 330 parts of acetone by volume. It was then chilled gradually to —10° C. where it gelled. At —20°, the gel started synerizing and at —25° the gel was definitely broken and the product had precipitated. At —25 to —30° C. 1000 parts of acetone were added and the resulting suspension was allowed to warm to room temperature and was filtered. The filter cake was washed with 1000 parts of fresh acetone and was then dried in an oven at 65° C.

The product was thus obtained in dry lumps which were readily crushed under light pressure to a fine powder. All but 7% of the product readily passed a 200 mesh sieve.

Example E

Forty parts of a commercial resin obtained by polymerizing ethyl methacrylate were dissolved in a mixture consisting of 316 parts of 99.5% alcohol and 60% parts of acetone by volume. The solution was agitated at room temperature and there was added a solution consisting of 40 parts of water in 100 parts of alcohol. The solution became slightly cloudy but no precipitation occurred. It was then gradually cooled. At 15° C., the solution had becor quite cloudy and at 12° C. it began to gel. At 10° C. the gel started to break and at 5° C. the гel had broken and there was a very fluid susj nsion. The charge was cooled to —15° C. and wı , there diluted with 140 parts of water. It waг then poured with 2500 parts of water to form a fine suspension.

The suspension was filtered and the cake was washed with water. It was then dried in an oven at 50° C. to form soft lumps which broke readily into a fluffy powder. Essentially all of the powder passed a 200 mesh sieve.

The finely-divided or powdered plastic is suspended in a suitable non-solvent medium appropriate for the specific plastic. A small amount of a suitable plasticizer may also be added, in order to increase the adhesion of the plastic particles to the glass surface with which they contact. The plasticizer preferably is soluble in the non-solvent suspension vehicle. A suitable system for cellulose acetate would comprise a suspending medium selected from a class consisting of mineral spirits, carbon tetrachloride, turpentine or the like. In such system dimethyl phthalate or the phthalic acid ester of monomethyl ether of ethylene glycol may be added as a plasticizer.

For ethyl cellulose in powdered form a suitable system would comprise paraffin hydrocarbons, e. g., gasolene and dibutyl phthalate, tricresyl phosphate or triglycol dihexoate as plasticizers.

For "Bakelite" resins in B state of polymerization the system would comprise mineral spirits or petroleum naphtha as suspension media and dibutyl phthalate as a plasticizer. For partial polyvinyl butyral resin the system would comprise petroleum naphtha or hydrogenated naphtha and dibutyl phthalate or triethylene glycol dihexoate, for the copolymer of vinyl chloride and vinyl acetate a system might comprise tetrahydronaphthalene or butyl alcohol with dibutyl phthalate as a plasticizer.

A system comprising finely-divided chlorinated rubber might consist of petroleum naphtha as a suspending medium and chlorinated diphenyl as the plasticizer.

A system comprising methyl methacrylate resin in finely-divided form would include mineral spirits as a suspension vehicle and dibutyl phthalate as the plasticizer.

The following constitutes specific examples of formulations which are contemplated as being within the scope of the invention:

Example I

| | Percent |
|---|---|
| Partial polyvinyl butyral resin | 21 |
| Dibutyl phthalate | 9 |
| Petroleum spirits | 70 |

Example II

| | Percent |
|---|---|
| Copolymer vinyl chloride and acetate | 20 |
| Dibutyl phthalate | 7 |
| Mineral spirits | 73 |

Of course the plasticizer is not always required.

These formulations are merely exemplary as it will be apparent that the proportions of the plastic employed may vary over a relatively wide range. Of course the number of particles per unit area will vary in accordance with the texture of the surface which it is desired to produce. This texture can be varied to some degree by increasing or decreasing the proportion of plastic in the suspending medium or by increasing or decreasing the thickness of the coating applied to the glass surface. By increasing the proportion of plastic particles in the suspending medium a greater number of particles are adhered to the glass surface, thus increasing the protected area and decreasing the matte effect. By decreasing the concentration of plastic particles in the suspension medium the area of glass exposed to etching is increased. The desired effect may be obtained by lightly stippling the surface with a spray of the suspended plastic, held at some little distance from the glass. Like effects might also be obtained by dipping the surfaces in a suspension medium containing only small amounts of suspended plastic and then evaporating the medium. Care should be observed not to completely mask the surface.

The glass, after it has been sprayed, or otherwise coated, may be baked at a moderate temperature, e. g., 100 to 300° F. for a few minutes, e. g., 5 to 15, in order to effect a more nearly complete union to the glass surface and also in the case of the heat hardenable resin, such as "Bakelite" or alkyd resins to effect further polymerization in situ.

After the glass surfaces have been coated to the desired degree with plastic particles and dried, they are exposed to etching, for example, with one or two normal hydrofluoric acid for a period dependent upon the degree of etching which is desired. The control of the etching action is well understood in the art. Probably a period of about 5 or 10 minutes will be satisfactory, though this period may be decreased or even greatly extended if so desired.

It will be apparent that the plates may be etched with vapors of hydrofluoric acid in a closed chamber if preferred.

After the etching operation is completed the plates are subjected to washing to remove any excess acid. They may also be treated with a solvent for the plastic, in order to remove the adherent particles or the particles may be removed mechanically by scraping. In some instances it may also be desirable to heat the glass to a temperature sufficiently high to char the plastic particles and thus to facilitate their removal by scraping or brushing.

The forms of the invention herein disclosed are to be considered merely as exemplary. It will be apparent to those skilled in the art that numerous modifications may be made therein without departure from the spirit of the invention or scope of the appended claim.

What I claim is:

A process of providing a matte finish upon a glass surface which comprises coating the surface with a continuous liquid film comprising a suspension of fine solid organic plastic particles resistant to etching acid in a volatile non-solvent liquid medium, evaporating the medium to leave the particles of plastic adherent in discrete state to the glass surface, thereby providing dispersed points of protection upon said surface and then exposing the surface to the etching action of hydrogen fluoride to etch the unprotected parts of the surface.

FREDERICK W. ADAMS.